(12) United States Patent
Sipes, Jr.

(10) Patent No.: US 12,620,765 B2
(45) Date of Patent: May 5, 2026

(54) COUNTER-PUMPED FIBER LASER ARRAY SYSTEM

(71) Applicant: OPTICAL ENGINES, INC., Colorado Springs, CO (US)

(72) Inventor: Donald Lee Sipes, Jr., Colorado Springs, CO (US)

(73) Assignee: OPTICAL ENGINES, INC., Colorado Springs, CO (US)

( * ) Notice: Subject to any disclaimer, the term of this patent is extended or adjusted under 35 U.S.C. 154(b) by 1309 days.

(21) Appl. No.: 17/394,624

(22) Filed: Aug. 5, 2021

(65) Prior Publication Data

US 2022/0045474 A1 Feb. 10, 2022

Related U.S. Application Data

(60) Provisional application No. 63/061,393, filed on Aug. 5, 2020.

(51) Int. Cl.
| | |
|---|---|
| *H01S 3/067* | (2006.01) |
| *H01S 3/0941* | (2006.01) |
| *H01S 3/16* | (2006.01) |

(52) U.S. Cl.
CPC ...... *H01S 3/06745* (2013.01); *H01S 3/06712* (2013.01); *H01S 3/09415* (2013.01); *H01S 3/1625* (2013.01)

(58) Field of Classification Search
CPC ............. H01S 3/06745; H01S 3/06712; H01S 3/09415; H01S 3/1625; H01S 3/005;

H01S 3/0078; H01S 3/0085; H01S 3/0092; H01S 3/06704; H01S 3/1618; H01S 3/06754; H01S 3/094003; H01S 3/2383
See application file for complete search history.

(56) References Cited

U.S. PATENT DOCUMENTS

| | | | | |
|---|---|---|---|---|
| 5,761,234 A | * | 6/1998 | Craig | ................... H01S 5/4031 |
| | | | | 372/50.1 |
| 9,917,411 B2 | | 3/2018 | Tafoya et al. | |
| 2002/0110335 A1 | * | 8/2002 | Wagner | ................ H01S 5/4025 |
| | | | | 385/89 |
| 2009/0080469 A1 | | 3/2009 | Nikolajsen | |

(Continued)

FOREIGN PATENT DOCUMENTS

WO WO 2021/011031 A1 1/2021

*Primary Examiner* — Xinning(Tom) Niu
(74) *Attorney, Agent, or Firm* — Leydig, Voit & Mayer, Ltd.

(57) ABSTRACT

A fiber laser system includes: an array of gain fibers configured to transmit signal light; and an array of tapered end caps configured to receive the signal light and output the signal light, wherein each gain fiber in the array of gain fibers is spliced to a respective tapered end cap of the array of tapered end caps. A counter-pumping light source is configured to output counter-pumping light. A dichroic mirror is configured to receive the counter-pumping light and the signal light from the array of tapered end caps. The dichroic mirror is further configured to either allow the counter-pumping light received by the dichroic mirror to pass through the dichroic mirror and reflect the signal light received by the dichroic mirror or allow the signal light received by the dichroic mirror to pass through the dichroic mirror and reflect the counter-pumping light received by the dichroic mirror.

18 Claims, 15 Drawing Sheets

(56)        References Cited

U.S. PATENT DOCUMENTS

| | | | |
|---|---|---|---|
| 2009/0245317 A1* | 10/2009 | Peng | H01S 3/094 |
| | | | 372/70 |
| 2010/0124393 A1* | 5/2010 | Li | G02B 6/241 |
| | | | 385/139 |
| 2011/0032602 A1* | 2/2011 | Rothenberg | G02B 6/02042 |
| | | | 359/341.1 |
| 2012/0230352 A1* | 9/2012 | Minelly | H01S 3/09415 |
| | | | 372/6 |
| 2013/0044768 A1* | 2/2013 | Ter-Mikirtychev | |
| | | | H01S 3/06758 |
| | | | 372/5 |
| 2015/0063380 A1* | 3/2015 | Liu | H01S 3/2383 |
| | | | 372/6 |
| 2020/0099192 A1 | 3/2020 | Sipes, Jr. | |

* cited by examiner

COUNTER-PUMPED FIBER LASER ARRAY SYSTEM

CROSS-REFERENCE TO RELATED APPLICATIONS

This application claims the benefit of U.S. Patent Application No. 63/061,393, filed on Aug. 5, 2020, which is incorporated by reference herein in its entirety.

BACKGROUND

Fiber lasers are becoming increasingly deployed in industrial, scientific, medical, and defense applications due to their high efficiency, robust and reliable construction, and relatively low system size and weight. There is considerable interest, for example, in the potential of using laser light for creating high intensity fiber laser sources for inertial fusion applications. While bulk solid-state lasers can provide the required high pulse energies, thermal effects limit their use to <10 Hz. Fiber lasers, on the other hand, can provide higher average power levels to the multi-kW level and better beam qualities, but are limited in pulse energy due to the onset of fiber nonlinearities. Coherently combined fiber laser arrays where a single seed source is split many ways and directed into a parallel array of fiber amplifiers and then coherently combined into the far field either in a tiled configuration, a mirror structure, or a diffractive optical element are promising. However, even lower power high energy density laboratory plasma (HELDP) applications may require hundreds, even thousands of individual fiber lasers. Further, conventional fiber laser arrays are very complex, requiring individual pump lasers, combiners and mode adapters for each channel.

SUMMARY

In an exemplary embodiment, the present disclosure provides a fiber laser system. The fiber laser system includes: an array of gain fibers configured to transmit signal light; an array of tapered end caps configured to receive the signal light from the array of gain fibers and output the signal light, wherein each gain fiber in the array of gain fibers is spliced to a respective tapered end cap of the array of tapered end caps. A counter-pumping light source is configured to output counter-pumping light. A dichroic mirror is configured to receive the counter-pumping light from the counter-pumping light source and to receive the signal light from the array of tapered end caps. The dichroic mirror is further configured to allow the counter-pumping light received by the dichroic mirror to pass through the dichroic mirror and reflect the signal light received by the dichroic mirror or allow the signal light received by the dichroic mirror to pass through the dichroic mirror and reflect the counter-pumping light received by the dichroic mirror.

In a further exemplary embodiment, each of the tapered end caps of the array of tapered end caps has a hexagonal shape.

In a further exemplary embodiment, each of the tapered end caps or the array of tapered end caps has a square shape.

In a further exemplary embodiment, the tapered end caps of the array of tapered end caps are tightly packed such that adjacent tapered end caps do not have space between them.

In a further exemplary embodiment, the fiber laser system further includes a V-groove holder having a V-groove configured to hold the array of tapered end caps.

In a further exemplary embodiment, the V-groove comprises filler material around the array of tapered end caps held in the V-groove.

In a further exemplary embodiment, the fiber laser system further includes a plurality of pre-amplifiers, each configured to receive light pulses from a respective variable-linewidth software-defined seed source and output amplified light pulses to a respective mode field adapter connected to a respective gain fiber of the array of gain fibers.

In a further exemplary embodiment, the counter-pumping light source is a multi-element laser diode source.

In a further exemplary embodiment, the fiber laser system further includes a shaping and imaging optics assembly configured to receive the counter-pumping light and focus the counter-pumping light towards the array of tapered end caps.

In another exemplary embodiment, the present disclosure provides a fiber laser system. The fiber laser system includes: an array of gain fibers configured to transmit signal light; an array of tapered end caps configured to receive the signal light from the array of gain fibers and output the signal light, wherein each gain fiber in the array of gain fibers is spliced to a respective tapered end cap of the array of tapered end caps. The tapered end caps of the array of tapered end caps are tightly packed such that adjacent tapered end caps do not have space between them.

In a further exemplary embodiment, each of the tapered end caps of the array of tapered end caps has a hexagonal shape.

In a further exemplary embodiment, each of the tapered end caps of the array of tapered end caps has a square shape.

In a further exemplary embodiment, the fiber laser system further includes a plurality of variable-linewidth software-defined seed sources, each configured to output light pulses corresponding to the signal light.

In a further exemplary embodiment, the fiber laser system further includes a plurality of pre-amplifiers, each configured to receive light pulses from a respective variable-linewidth software-defined seed source and output amplified light pulses to a respective mode field adapter connected to a respective gain fiber of the array of gain fibers.

In yet another exemplary embodiment, the present disclosure provides a Titanium:Sapphire (Ti:Sapphire) laser system. The Ti:Sapphire laser system includes: an array of gain fibers configured to transmit signal light; an array of tapered end caps configured to receive the light from the array of gain fibers and output the light, wherein each gain fiber in the array of gain fibers is spliced to a respective tapered end cap of the array of tapered end caps. A polarizer is configured to receive the light output from the array of tapered end caps and to separate the received light into two orthogonal polarizations. A second harmonic generation (SHG) unit is configured to receive the two orthogonal polarizations and recombine them to form an output beam of the Ti:Sapphire laser system.

In a further exemplary embodiment, each of the tapered end caps of the array of tapered end caps has a hexagonal shape.

In a further exemplary embodiment, each of the tapered end caps of the array of tapered end caps has a square shape.

In a further exemplary embodiment, the SHG unit is further configured to utilize a frequency doubling scheme in heated lithium triborate (LBO) crystals or barium borate (BBO) crystals.

In a further exemplary embodiment, the Ti:Sapphire laser system further includes a plurality of variable-linewidth software-defined seed sources, each configured to output light pulses and a plurality of pre-amplifiers, each configured to receive light pulses from a respective variable-linewidth software-defined seed source and output amplified light pulses to a respective mode field adapter connected to a respective gain fiber of the array of gain fibers.

DETAILED DESCRIPTION

Figure 1:
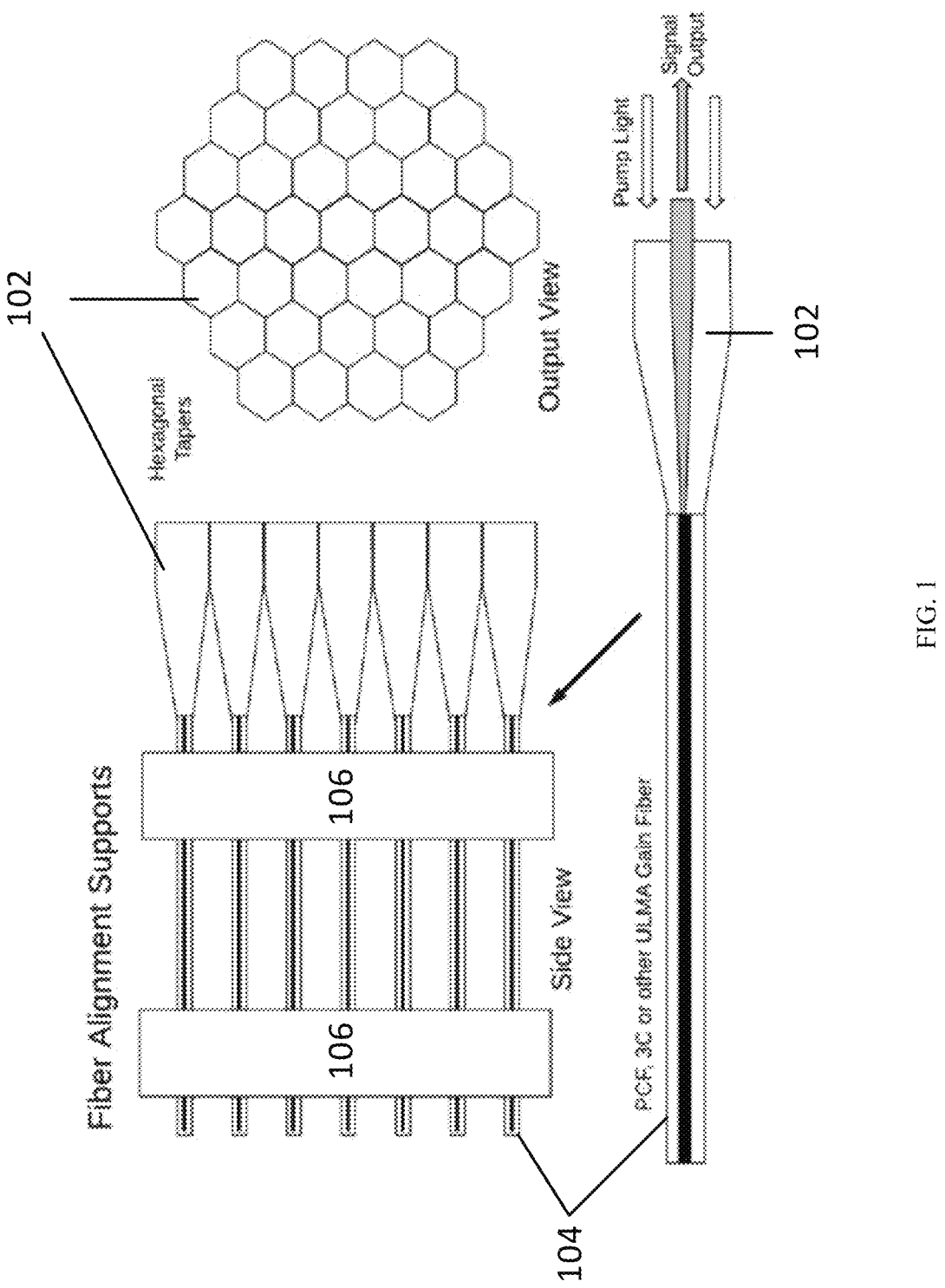
FIG. 1 illustrates a fly's eye fiber laser array (FEFLA) structure with tapers and constituent components according to an embodiment of the disclosure.

Exemplary embodiments of this disclosure provide useful and cost-effective fiber laser arrays which utilize fiber laser components in a parallel and/or consolidated manner.

For ease of understanding, exemplary embodiments of the present disclosure may be conceptualized as providing bio-mimicry of the eye of a fly using a structure referred to herein as a fly's eye fiber laser array (FEFLA). In the eye of a fly, incoming light is collected and processed in parallel through a set of crystalline lenses and tapered cones to focus and concentrate the light to individual retinula cells. In this way, a large collecting area can be created without the convex focusing optics such as those found in the eyes of most other animals (including humans) and in modern optical systems. This compound eye architecture is especially effective when incoming light needs to be focused to an array of small focal points. Paralleling the pumping of a large fiber laser array by providing a parallel pumping method in accordance with exemplary embodiments of the present disclosure may resemble the mechanism through which the eye of a fly collects and directs light to neurons.

Other fiber laser arrays have drawbacks when compared to the FEFLA. For example, the 60 Channel XCAN coherently combined Ultra-Fast System developed by Ecole Polytechnique has an architecture in which each channel needs its own 2+1:1 signal/pump combiner as well as individual laser diode pumps and driver circuits with the necessary fiber splices, fiber management, mounting, and heatsinking. This system is very complex and is very expensive since the cost of this pumping scheme scales linearly with the number of channels.

For another example, in order to reduce cost and complexity, other researchers are working to "parallelize" the architecture of the 60 Channel XCAN coherently combined Ultra-Fast System through the use of multi-core fibers. In the multi-core approach, multiple gain fiber cores are placed within the same cladding. Inputs are free space imaged into each core, and the pump light can also be imaged into each core or cladding pumped. This approach is very compact, and there is overall stability by way of having all of the cores in the same cladding. However, the primary disadvantage of this approach is the inability to design individual ultra large mode area (ULMA) fibers and to scale to large numbers of fibers. In addition, a monolithic construction of the light path in the fiber cores is not possible because the signal light needs to be free space coupled since there is no "fan out" capability for the individual fibers. Therefore, an all fiber approach is preferred for ruggedness and reliability as well as size and cost.

It is advantageous to have individually optimizable gain fibers in a completely monolithic architecture with a parallel pump structure. A FEFLA architecture according to exemplary embodiments of the disclosure is able to achieve this by biomimicking the compound eyes of a fly since the individual optical columns of the eyes of a fly collect and direct light over a wide collection area to small retinula collection areas. This same approach can be applied to a high power laser array having a FEFLA architecture.

One advantage of a FEFLA architecture is that the pumping function for the gain fibers is simplified. A cheap single pump source can be used as opposed to having to use multiple pump sources. This is achieved by splicing gain fibers to tapered end caps. Tapered end caps provide a simplified way of channeling the pump light into the gain fibers without needing lenses, collimators, etc. Additionally, a FEFLA architecture may be used as an input for Titanium-Sapphire (Ti:Sapphire) lasers. Ti:Sapphire lasers are very useful for producing tunable ultra-fast red and near-infrared lasers.

The top portion of FIG. 1 illustrates, in an exemplary embodiment, a side view and an output view of hexagonal fibers in a closely packed configuration, wherein the hexagonal end caps are tapered and spliced to individual ULMA gain fibers 104. The packing of the hexagonal fibers for near zero pump light leakage is advantageous. The fiber alignment support structures 106 are configured to hold the fiber cores of the gain fibers 104 of the array straight relative to each other and such that the fiber cores are not angled relative to one another. The fiber alignment support structures 106 may be made of anything that is stable and has precise slots or holes for the gain fibers 104 (e.g., a silicon mold structure with individual V-grooves for respective fibers disposed on multiple layers with spacers between the layers). It is further advantageous for the distances between adjacent fiber cores to be uniform. An additional support structure, such as a larger V-groove, may be used to hold an array of hexagonal tapered end caps 102 in place (providing dense packing and precise alignment, at micron levels of accuracy), so as to accommodate the hexagonal tapered end caps stacking evenly so as not to create stresses and to avoid fiber bending.

The bottom portion of FIG. 1 illustrates, in an exemplary embodiment, a counter-pumping process with respect to a single gain fiber 104 of the array, in which the pumped light propagates in the opposite direction as the signal light. The fiber laser receives its pump light through the small aperture at the hexagonal taper 102 at the end of the gain fiber 104 and then utilizes a double clad structure where the pump light is guided in an outer clad of the gain fiber 104 and the doped gain core of gain fiber 104 is in the center. Counter-pumped light propagating through the outer clad eventually crosses the core of the fiber and is absorbed. The concentration of the dopant ion (e.g., Ytterbium (Yb)) is such that the gain fiber 104 may see a pump absorption somewhere between 1-10 dB/m.

In an exemplary embodiment, the cladding pumped fiber laser utilizes a brightness transformation from a relatively large diameter, low numerical aperture (NA) pump source (typically a bundle of fiber-coupled laser diodes) to a small diameter, high NA gain fiber 104.

An array of fiber lasers is challenging to produce in that an array of regularly spaced small fiber apertures are to be illuminated efficiently without missing the fibers with the focused pump light. Since the cost/W of pump sources goes down with absolute power level, it is virtually impossible to image a large diameter incoherent light source into an array of small apertures. For example, in a conventional system, an array of lenses to focus the pump light into an array of fibers is required which increases the cost/W of the system significantly. However, by introducing tapers to the fibers in accordance with exemplary embodiments of the present disclosure, the need for a lens array is eliminated. In addition to tapering the fibers, the close packing of the FEFLA hexagonal fibers combined with a pump source greatly reduces the complexity of the system and the cost/W of the system. Thus, in the embodiments described herein, by relying on biomimicry and making use of existing advanced glass processing techniques, exemplary embodiments of the present disclosure are able to provide a highly efficient, compact, rugged, and low-cost manner for pumping an arbitrarily large array of fiber lasers with a single low-cost multi-kW pump source.

It will be appreciated that optical fibers can be pulled to very high dimensional diameter accuracies. Diameter accuracy at the sub-10 μm level or even to the 1 μm level are possible. Exemplary embodiments of the present disclosure utilize precisely pulled hexagonal glass rods, for example, having approximately 1 mm diameter. The dimensional accuracy allows for the hexagonal fibers to be closely packed to levels that allow for very little light leakage with near 100% collection efficiency, an advantageous feature in high power applications. With this close packing, a solid segmented aperture is presented to a single high-power pump source. While individual low-power laser diodes can be as much as $50/W to $60/W including drivers and even higher with individual channel combiners, pump sources at the kW level can be as low as $1/W.

Further, the hexagonal fibers may be precisely tapered to create adiabatic tapers with near 100% efficiency to match the cladding diameters of the individual gain fibers. For example, over a length of approximately 15 mm, a 1 mm diameter fiber has been successfully tapered and spliced to a 40/200 μm photonic crystal fiber (PCF) with the gain core doped with Yb to make a counter-pumped amplifier.

Figure 2:
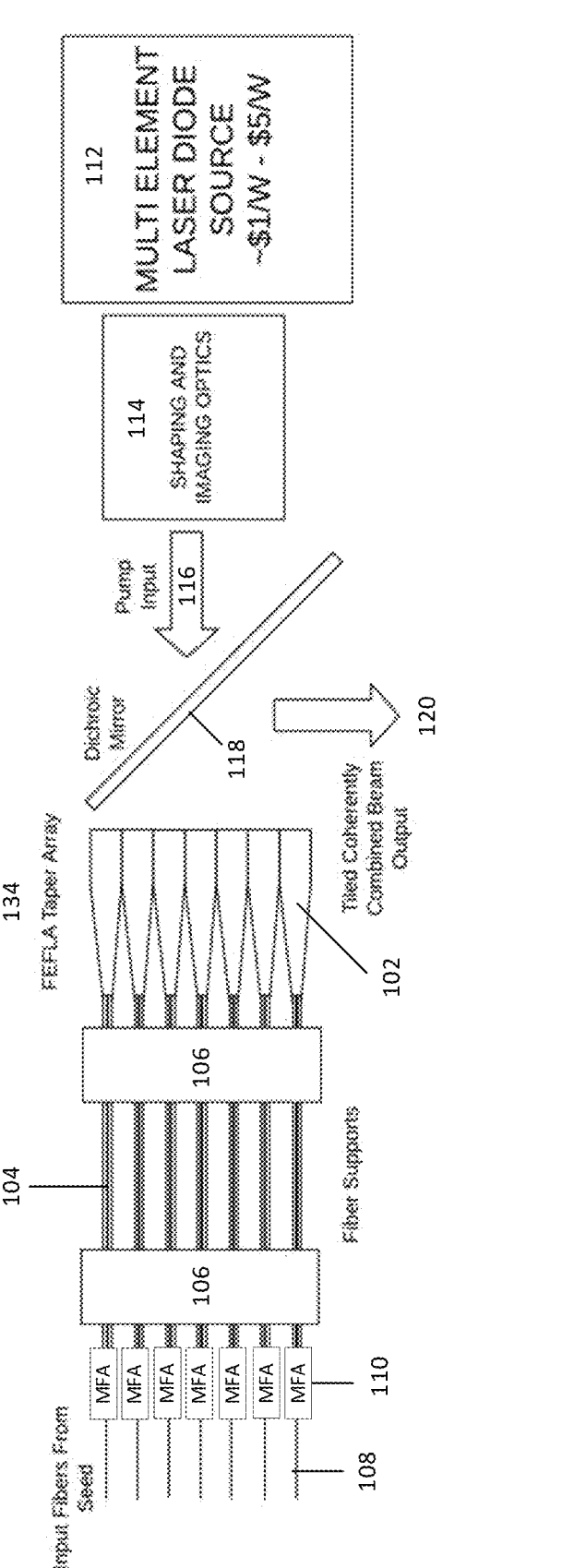
FIG. 2 illustrates a FEFLA system showing a multi-element laser diode pump source, pump optics, and dichroic mirror according to an embodiment of the disclosure.

FIG. 2 illustrates a schematic of a FEFLA system in an exemplary embodiment. In the exemplary embodiment of FIG. 2, instead of having individual combiners, splices, pump diodes, and drivers for a plurality of pump sources corresponding to a plurality of gain fibers, a single multi-element laser diode source 112 is provided, thereby achieving an over 90% reduction in the complexity of the fiber laser array pumping system. This system is amenable to combined fiber-coupled source pumping or direct imaging of a large high-powered laser diode stack. The free space output is amenable to tiled beam combining, diffractive optical element beam combining, or mirror system beam combining.

As depicted in the left side of the exemplary embodiment of FIG. 2, input fibers from respective seeds 108 are joined by respective mode field adapters (MFAs) 110 to respective gain fibers 104 which are supported by fiber support structures 106. Various types of seed inputs may be used, taking into account that the MFA 110 gain may be limited to about 25 dB and thus the seed inputs 108 should have a desired wavelength, power level, temporal profile, and linewidth. The wavelength of the signal light carried in the gain fibers 104 may be, for example, in the range of 1020 nm-1080 nm (e.g., 1030 nm or 1064 nm). As discussed above with respect to FIG. 1, the fiber support structures 106 are configured to hold the fiber cores of the array straight relative to each other and such that the fiber cores are not angled relative to one another. The fiber support structures 106 may include, for example, respective V-grooves for each respective fiber, arranged in a layered stackup corresponding to the positioning of the fibers. An additional support structure, such as a V-groove, may be used to hold and support the FEFLA taper array 134, and in case the fibers 104 are sufficiently rigid, the fiber support structures 106 may not be needed.

As depicted in the right side of FIG. 2, a multi-element laser diode source 112 is provided in combination with shaping and imaging optics 114. For example, with regard to the multi-element laser diode source 112, the FEFLA system may utilize a Yb-based laser system which is pumped in the 915 nm to 976 nm region and lases in the 1020 nm to 1080 nm region. In other embodiments, other laser-based systems that may be utilized are Neodymium (Nd), Francium (Fr), Thulium (Tm), and Holmium (Ho), for example.

The shaping and imaging optics 114 focus and guide the pump light 116 from the multi-element laser diode source 112 so that it is accurately pumped into the hexagonal tapered end 102 (and ultimately to the fiber cladding) of each respective fiber laser in the FEFLA system. The shaping and imaging optics 114 distribute the pump light 116 to the FEFLA fiber array evenly and do not waste light around the edges of the array. To accomplish this, the hexagonal array is presented with a uniform light intensity field. Therefore, multiple light beams are transformed from the fiber pump array into a combined uniform field to be imaged into the FEFLA array. For example, in an embodiment, if the overall shape of the FEFLA array is square, a square fiber (see, for example, FIGS. 13A-13B below) may be used which acts like a beam shaper homogenizer. In another embodiment, if the overall shape of the FEFLA array is round, a round multimode fiber can accomplish this as well.

The FEFLA system depicted in FIG. 2 further includes a dichroic mirror 118 positioned between the fiber laser array and the source of the pump light 116. The dichroic mirror 118 allows the 976 nm pump light 116 to be transmitted through the dichroic mirror 118 so that this light can counter-pump the fiber laser array of the FEFLA system. The dichroic mirror 118 also reflects the signal light output from the fiber laser array to guide the tiled coherently combined beam output 120 in a different direction (away from the fiber laser array and away from the pump source).

By utilizing a multi-element laser diode source 112, shaping and imaging optics 114, and a dichroic mirror 118 in the configuration of the FEFLA system shown in FIG. 2, the cost and complexity of a counter-pumped fiber laser array system is significantly reduced. For example, the multi-element laser diode source 112 may only cost between $1/W to $5/W. Additionally, the multi-element laser diode source 112 combined with the shaping and imaging optics 114 avoids the complexity and cost associated with having individual pump sources for each fiber laser in the array.

The use of the closely-packed array 134 of tapered hexagonal fibers 102 spliced to the gain fibers 104, for example as depicted in the top portion of FIG. 1, facilitates these advantages being achieved. In conventional high-power systems, light leakage is a major issue, as the leakage of high-powered light can cause system components to become damaged and/or melt. Exemplary embodiments of the FEFLA system, however, avoid such light leakage by utilizing closely-packed fiber arrays which are able to receive pump light in bulk and at high powers with very little, if any, light leakage. In an exemplary implementation, the hexagonal fibers 102 depicted in FIG. 1 are tapered in accordance with the adiabatic condition to provide for a gentle enough slope that provides high efficiency through the taper (i.e., conserving brightness by avoiding undesirable scattering and back-reflections), and are spliced to respective gain fibers 104. In this way, the bulk pump light 116 from the multi-element laser diode source 112 and shaping and imaging optics 114 is received by the array 134 of tapered hexagonal fibers 102 in an efficient and non-damaging manner.

It will be appreciated that even with a large number of fibers in the array, the overall profile of the array is still relatively small (e.g., 0.5 inches across for an array of 100 fibers), allowing a large amount of power to be provided for counter-pumping with a relatively small overall aperture. For example, 200 W may be provided in a 125 μm diameter aperture. Therefore, for illustration, a bundle of 125 μm fibers in a 10 mm square bundle equals 6400 fibers (100 mm$^2$/(0.125 mm)$^2$=6400) and may achieve a total power output of 1.2 megawatts (6400×200 W=1.2 megawatts).

The tapered hexagonal fiber 102 which is spliced to a respective gain fiber 104 may be referred to as a "tapered end cap" 102. Exemplary configurations of a counter-pumped amplifier system utilizing tapered end caps are described, for example, in U.S. patent application Ser. No. 16/513,191, filed Jul. 16, 2019, and in International Patent Application No. PCT/US2020/020170, filed Feb. 27, 2020, both of which are incorporated herein by reference in their entireties.

Figure 3:
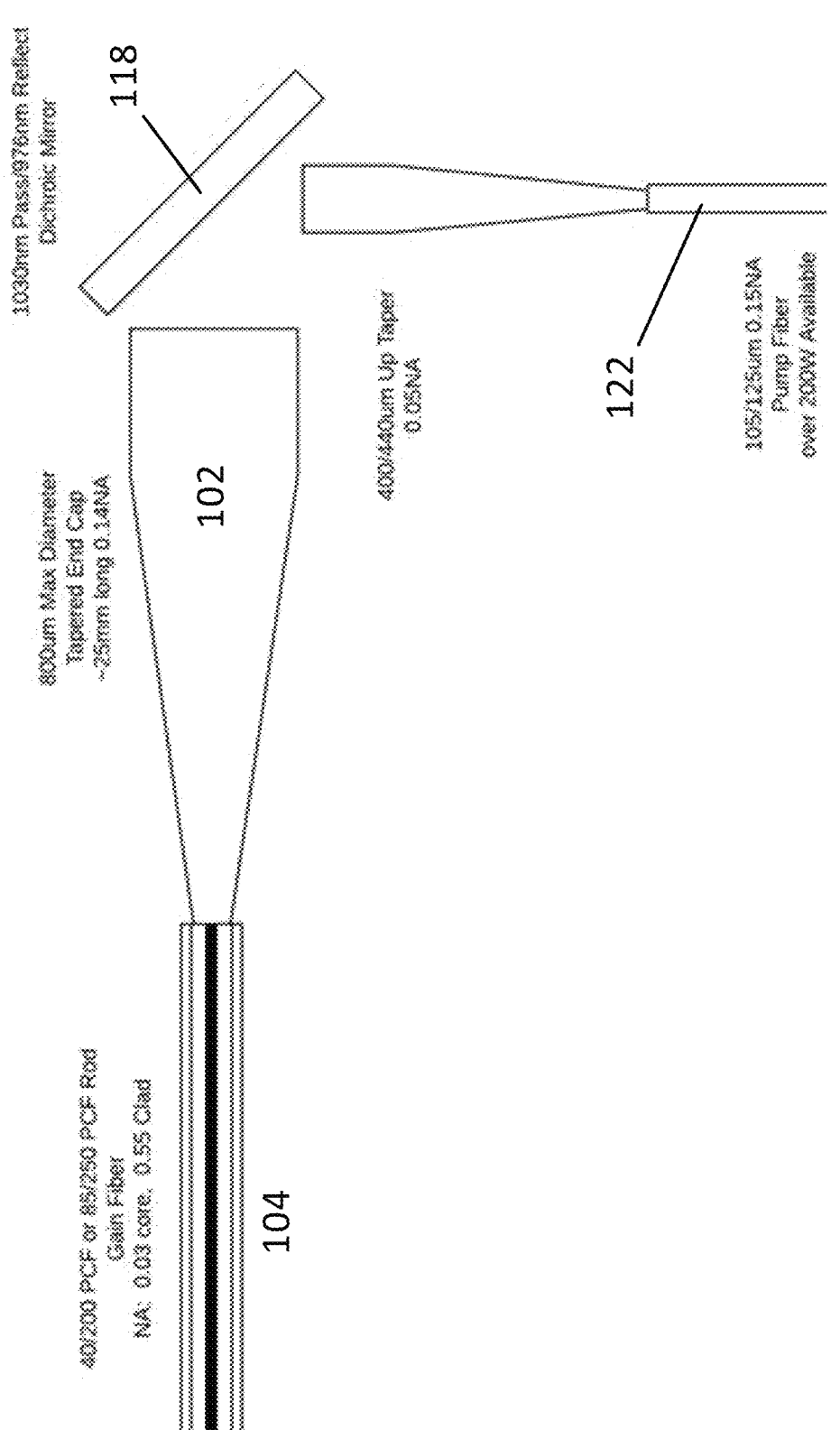
FIG. 3 illustrates a tapered end cap counter pumped large mode area (LMA) fiber amplifier design according to an embodiment of the disclosure.

As depicted in FIG. 3, the architecture of a tapered end cap 102 counter-pumped amplifier, which has fiber tapers and very close mounting distances, replaces the lenses, precision mountings, and long distances conventionally utilized in free space counter-pumped architectures. Fiber tapering is utilized to both transition the pump fiber 122 diameter to adjust the "jump" from the pump fiber 122 to the amplifier over a distance of less than 5 mm. A high brightness 105/125 μm 0.15 NA pump fiber 122 is up-tapered to a 400/440 μm fiber with a resulting NA reduction of under 0.05 NA. This low divergence pump beam "jumps' a <5 mm gap to a taper that goes from approximately 1 mm to a 200 to 250 μm core diameter of an amplifier gain fiber 104. On the signal side, the amplified output signal grows adiabatically unguided to the output. A dichroic mirror 118 separates the two beams.

Advantages of utilizing a tapered end cap 102 counter pumped amplifier system include:

The design is completely agnostic to the type of gain fiber dimensions utilized in the amplifier, so no new counter pumped combiner transition fibers need to be developed and fabricated.

The core signal output of the fiber amplifier expands adiabatically unguided so there are no intermediate guiding sections to affect the efficiency or quality of the signal output beam.

The matching of the pump brightness to the gain fiber 104 brightness allows for pump coupling that is greater than 95% efficient.

The coupled tapers create a design that is highly alignment insensitive. A very small and very rugged mounting can be created.

The tapered end cap 102 is expected to be about 15 mm long; this has virtually no contribution to the B integral. This is advantageous for ultrafast systems.

Both pump input and laser output are anti-reflection (AR) coated, and the length of the tapered end cap 102 produces very little in the way of backward coupled light.

Figure 4:
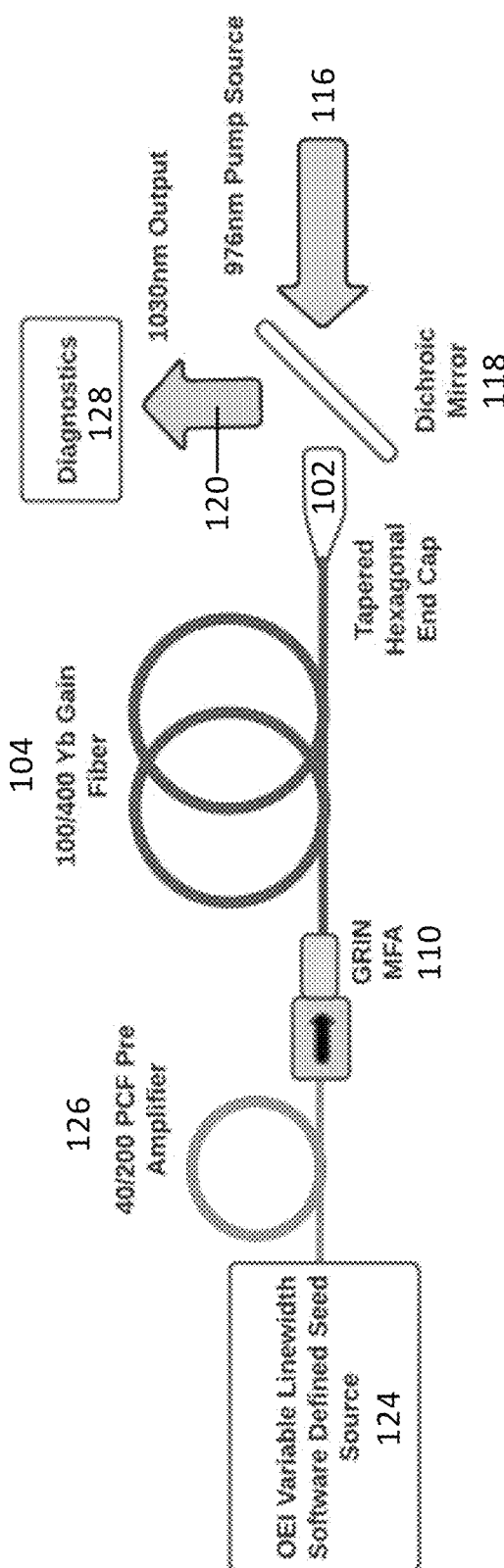
FIG. 4 illustrates a single channel Ytterbium (Yb) fiber amplifier test setup according to an embodiment of the disclosure.

FIG. 4 illustrates an exemplary embodiment of a single-channel Yb fiber amplifier test setup. This setup includes a variable-linewidth software-defined seed source 124 where a shaped 100 ns pulse is created. The variable-linewidth software-defined seed source 124 includes, but is not limited to, an electro-optic modulator and double pass amplifier. A 40/200 PCF pre amplifier 126 follows to set the input energy from the seed source 124 to different levels. A mode field adapter (MFA) 110 is used with the 100/400 Yb gain fiber 104. For example, a graded-index mode field adapter (GRIN MFA) 110 may be used. The gain fiber 104 is spliced to a tapered hexagonal end cap 102. The GRIN MFA 110 is pumped from a 976 nm 1 kW pump source 116. In the example shown in FIG. 4, the dichroic mirror 118 kicks out the 1030 nm output 120 to diagnostic equipment 128 for testing purposes. The diagnostic equipment 128 may include, but is not limited to, a power meter, a photodetector, and/or a beam camera. The test setup of FIG. 4 makes it possible to set the gain fiber 104 length, maximize the achievable gain (which is advantageous in a multi-channel system), and make the linewidth as narrow as possible (which is advantageous for frequency doubling efficiency).

Figure 5:
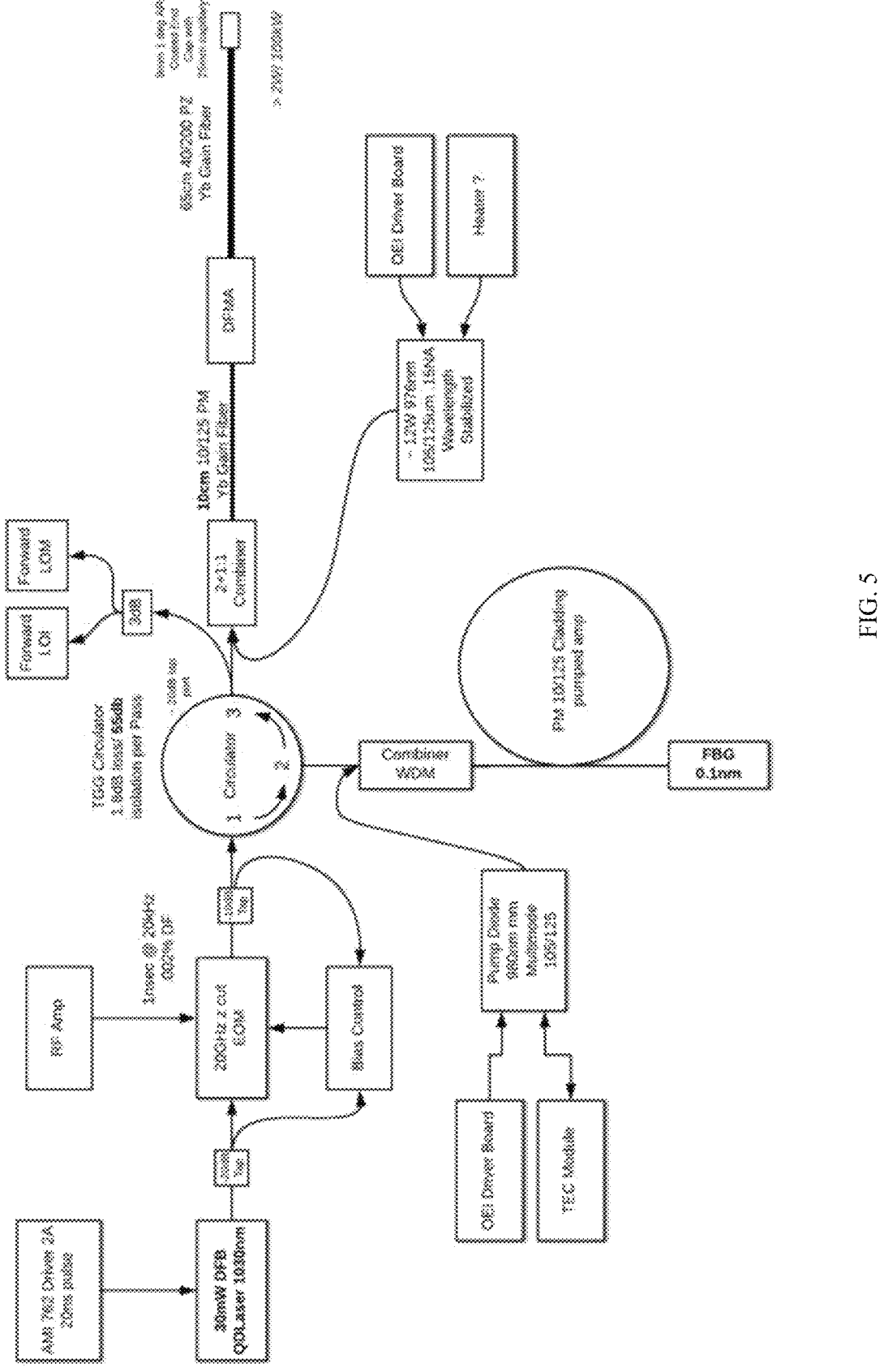
FIG. 5 illustrates a variable linewidth software-defined seed source according to an embodiment of the disclosure.

FIG. 5 illustrates an exemplary embodiment of a variable linewidth software-defined seed source. The variable linewidth software-defined seed source is an incoherent multi-channel seed system with corresponding inputs for each amplifier channel. These inputs for each amplifier channel provide an input power such that the overall gain stays below about 25-28 dB. The seed source has a variable seed linewidth and low amplified spontaneous emission (ASE)

noise. It includes 100 nm pulse forming systems, amplifier stages, and delay lines. In an embodiment, the seed source may be split to pump multiple amplifiers.

The seed source is a seed laser that is able to utilize a wide array of input waveforms that can be amplified uniformly with sub-nanosecond timing control and very precise power control. The seed laser has a variety of different master oscillator sources from distributed feedback lasers (DFBs) to super luminescent diodes (SLEDs), as well as a single frequency ring laser tunable from 1018 nm to 1090 nm. Replaceable fiber Bragg grating (FBG) filters in the amplifier leg of a double pass amplifier provide for spectral sculpting and creating a precise linewidth. Additionally, the post circulator amplifier stage allows for gains up to 50 dB to be achieved. Further, the combination of pulsing the seed laser and a 20 GHz Mach-Zehnder electro-optic modulator (MZ EOM) fed by an arbitrary waveform generator (AWG) provide for precise time and level control.

In an embodiment, the seed source and the single channel power amplifier are multiplied to form the FEFLA system. For doubling efficiency, the linewidth is made as narrow as possible. The gain is made as high as possible to simplify the FEFLA parallel amplifier chain. Additionally, a single mode that is well-adapted is the input through the GRIN mode adapter.

Figure 6:
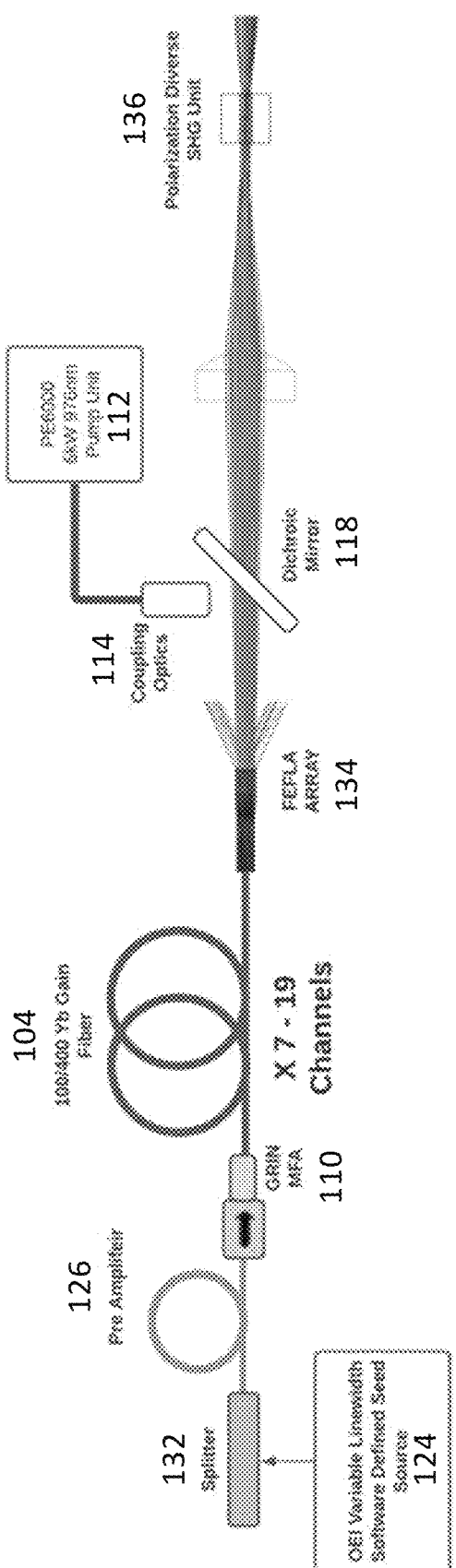
FIG. 6 illustrates a schematic of a FEFLA 1 joule (1 J) system according to an embodiment of the disclosure.

It will be appreciated that the exemplary seed source shown in FIG. 5 is merely an example, and in other embodiments, other types of seed sources may be used as the seed source 124 in FIG. 4 (and also in FIG. 6). However, as mentioned above, the MFA gain is limited to about 25 dB and the seed source should have a desired wavelength, power level, temporal profile and linewidth.

A 6 kW fiber laser pump source makes use of fiber coupled laser diodes. The pump source outputs the full 6 kW in a 1 mm diameter, 0.22 NA fiber. In an embodiment, a 7 channel FEFLA system allows for over a factor of 3 reduction in NA. In another embodiment, a 19 channel FEFLA system allows for a factor of 5 reduction in NA. The 1 mm fiber is coupled into a 1 mm hexagonal fiber of about 0.5 m in length to homogenize the mode into a sharp hexagonal pattern. The FEFLA system is pumped in the maximum uniformity mode with about 10% of the light spilling out around the array. Hexagonal rods tapered and coupled to 200 μm fibers collect this extra light and use it for pumping pre-amplifiers for each channel. This simplifies the system and eliminates the need for extra pump units and their electronics.

FIG. 6 illustrates an exemplary embodiment of a FEFLA 1 joule (1 J) system. This system is able to provide from 500 mJ to over 1 J per pulse in a 100 ns pulse at a 1 kHz repetition rate. In an embodiment the system outputs 1 J in a 100 ns pulse at 1 kHz pulse repetition frequency (PRF) at 1 μm with 400 mJ at the second harmonic.

In the exemplary embodiment depicted in FIG. 6, a double pass preamplifier unit 126 through an optical circulator will provide over 30 dB of gain with very little ASE noise. All of the pulse shaping and spectral filtering is completed in this unit with AC power, air cooling, and complete software control. The single mode splitter 132 provides the 7-19 channels. The output has a number of fiber connectors (e.g., FC angle physical contact (APC) connectors), one for each channel. There are 7-19 outputs with 100 ns pulses with exponentially increasing pulse shapes to ensure a flat output (or whatever output enhances SHG and Ti:Sapphire pumping). The lasing wavelength and linewidth are selected to maximize SHG Ti:Sapphire pumping. The seed source 124 is packaged into a finished air cooled unit with complete operating software.

The power amplifier provides about 27 dB of gain. For 150 mJ this corresponds to a 30 μJ input to the power amplifier. In an embodiment, such as for a 19 channel system, a pre amplifier 126 and an isolator after the splitter 132 may be used on each channel. In this embodiment, if amplifiers on each channel are required, additional passive FEFLA channels may be added around the gain fiber channels 104 to harvest lost light and direct it towards 2+1:1 co-pumped combiners on each pre amplifier, or a composite amplifier may be created using a double mode field adapter (DMFA) that allows the unabsorbed light in each amplifier to be coupled into each pre amplifier 126, which can achieve a 30 dB gain. In an alternate embodiment, such as for a 7 channel system, a single larger amplifier may be used before the splitter 132.

Figure 7:
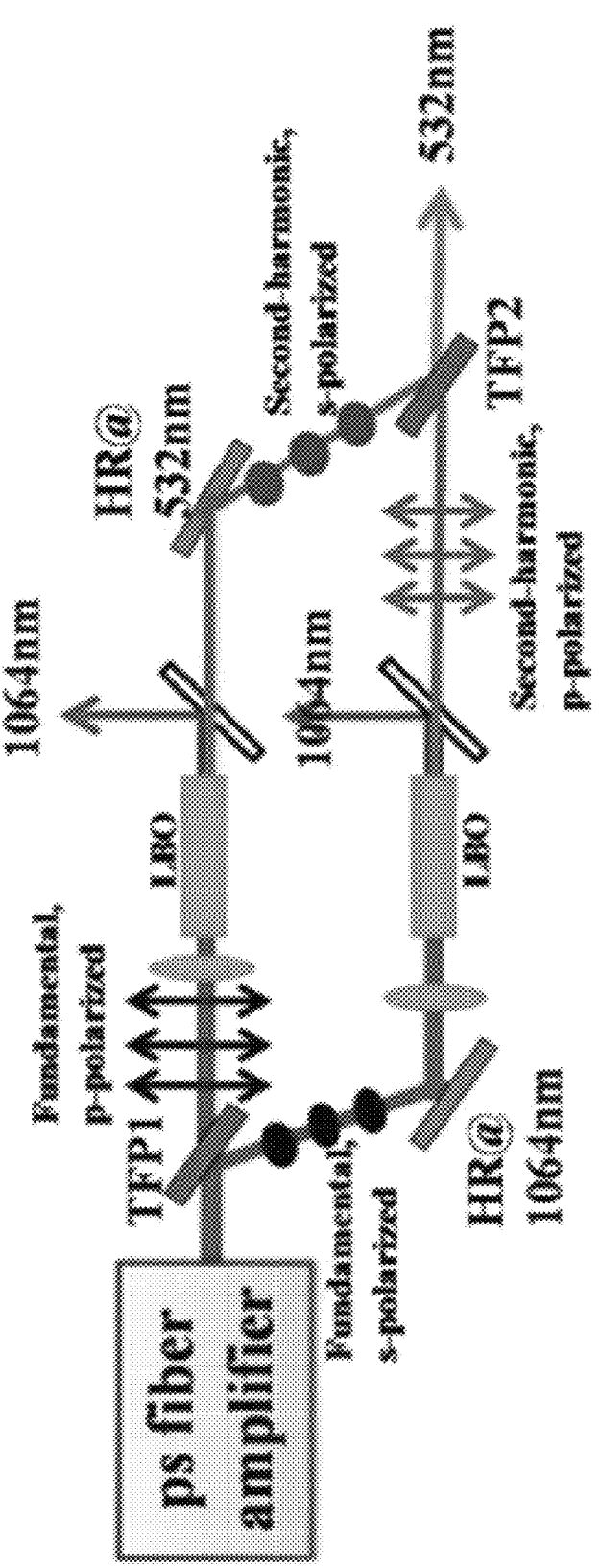
FIG. 7 illustrates a polarization diverse method for second harmonic generation (SHG) in a FEFLA system according to an embodiment of the disclosure.

In an exemplary embodiment, it is advantageous to use a FEFLA system for a low cost, high energy pump for a Ti:Sapphire laser, and to do this, the system is set up for efficient second harmonic generation (SHG). Because the 100/400 μm Yb gain fiber operates in an unpolarized fashion it is advantageous to create SHG in a polarization diverse manner. FIG. 7 illustrates an exemplary embodiment of a polarization diverse method for SHG in a FEFLA system. The polarization diverse method is a frequency doubling scheme for the single channel in heated lithium triborate (LBO) or barium borate (BBO) crystals. Herein, LBO and/or BBO crystals may be referred to as SHG crystals. The exemplary embodiment of FIG. 5 for a single channel is scalable for a 19 channel FEFLA system. In this embodiment, each of the FEFLA laser channels would be incoherent with respect to each other and individually frequency doubled and then focused as a group into the array. Two heated SHG crystals are placed in the beam path after a polarizer that separates the output of the fiber amplifier into its two orthogonal polarizations. After the SHG crystals, the two polarizations are recombined to create the output beam.

In an embodiment, the SHG system is attached to a single fiber amplifier. An oven provides uniform heating for efficient and uniform frequency doubling.

Modeling in SNLO or Comsol may be conducted to verify performance and to obtain a better understanding of the SHG process in the presence of nonlinear broadening and multimode operation. Additionally, in another embodiment, the SHG system may be used in the FEFLA system and thermal effects of high pulse energy and average power of the FEFLA system using the SHG system may be investigated.

Figure 8:
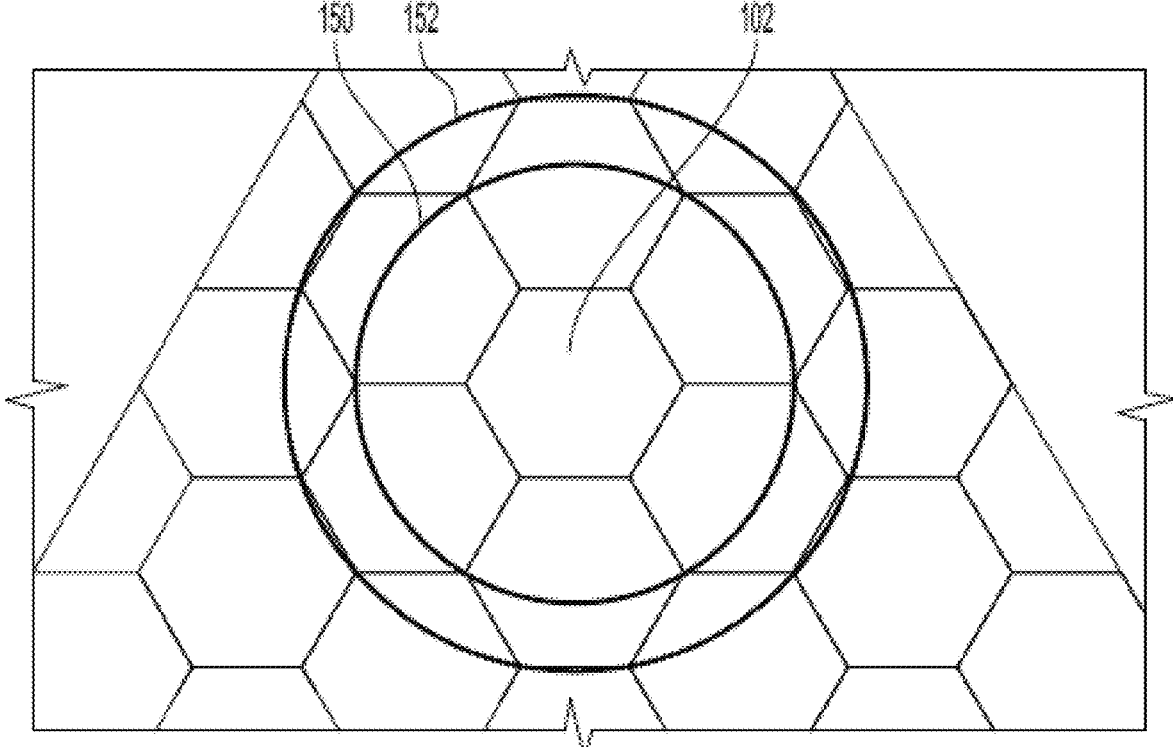
FIG. 8 illustrates a face view of a 7 channel FEFLA array according to an embodiment of the disclosure.

FIG. 8 illustrates a face view of a 7 channel FEFLA array arranged in a V-groove according to an exemplary embodiment of the disclosure. Due to the granularity near the apex of the V-groove and because of the challenges of placing and stacking the hexagonal tapered end caps 102 and having them stay in place that arose near the apex of the V-groove, polished half hexagonal rods are placed interstitially close to the V-groove to provide support for the 7 channel FEFLA array. The 7 channel FEFLA array includes the 7 full hexagonal tapered end caps 102 located within the outer circle 152, and the remaining hexagonal and half-hexagonal shapes correspond to filler material which is utilized to ensure tight packing of the 7 channels.

During the stacking process, the hexagonal tapered end caps 102 had a degree of variance such that there were gaps between the hexagonal tapered end caps 102. After some measuring and selecting the most uniform hexagonal tapered end caps 102, it was possible to put together a very uniform array. By measuring the size of the gaps between the hexagonal tapered end caps 102 and calculating the area of the gaps, it was estimated that the gap areas were only about 2% of the area of the 7 channel FEFLA array.

In one embodiment, maximum pumping efficiency (i.e., lowest loss pumping) is achieved by pumping the inner circle 150. In an exemplary test for this embodiment, the center hexagonal tapered end cap 102 is full of pump light and the six surrounding hexagonal tapered end caps 102 are about 63.4% full and only about 2% of the pump light is wasted from the small voids between the hexagonal tapered end caps 102.

In another embodiment, maximum pumping uniformity (i.e., full pumping) is achieved by pumping the outer circle 152. In an exemplary test for this embodiment, about 84.9% of the pump light would enter the 7 channel FEFLA array and about 15.1% of the pump light is "lost" from the small voids between the hexagonal tapered end caps 102. However, the pump light that is "lost" in this embodiment can still be used to pump other components.

Figure 9A:
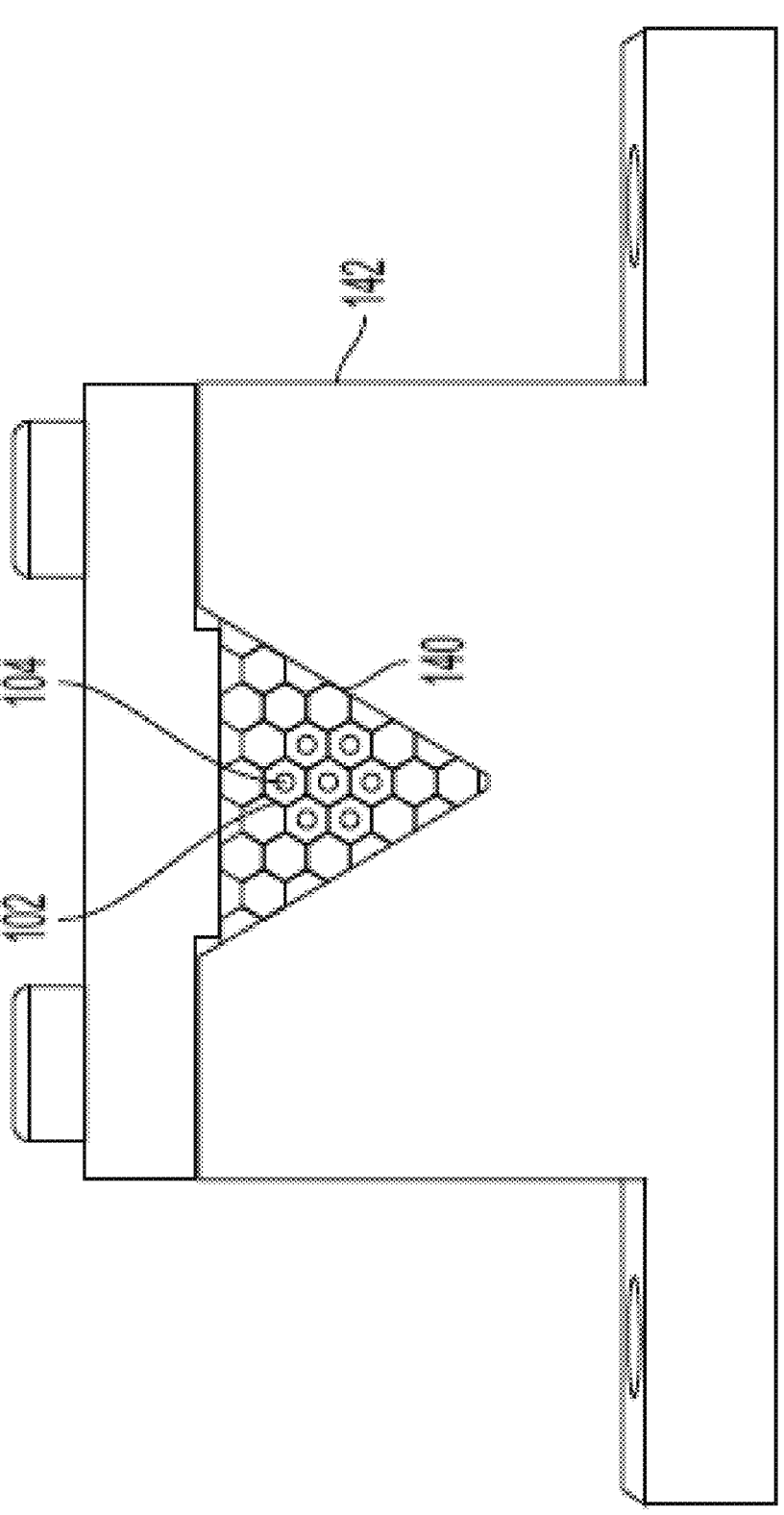
FIG. 9A illustrates the 7 channel FEFLA array in a V-groove holder according to an embodiment of the disclosure.

FIG. 9A illustrates the 7 channel FEFLA array in a V-groove holder 142 having a V-groove 140 according to an exemplary embodiment of the disclosure. Inside the V-groove 140 is a 7 channel FEFLA array with 7 hexagonal tapered end caps 102 spliced to gain fibers 104, along with filler shapes for ensuring tight packing.

Figure 9B:
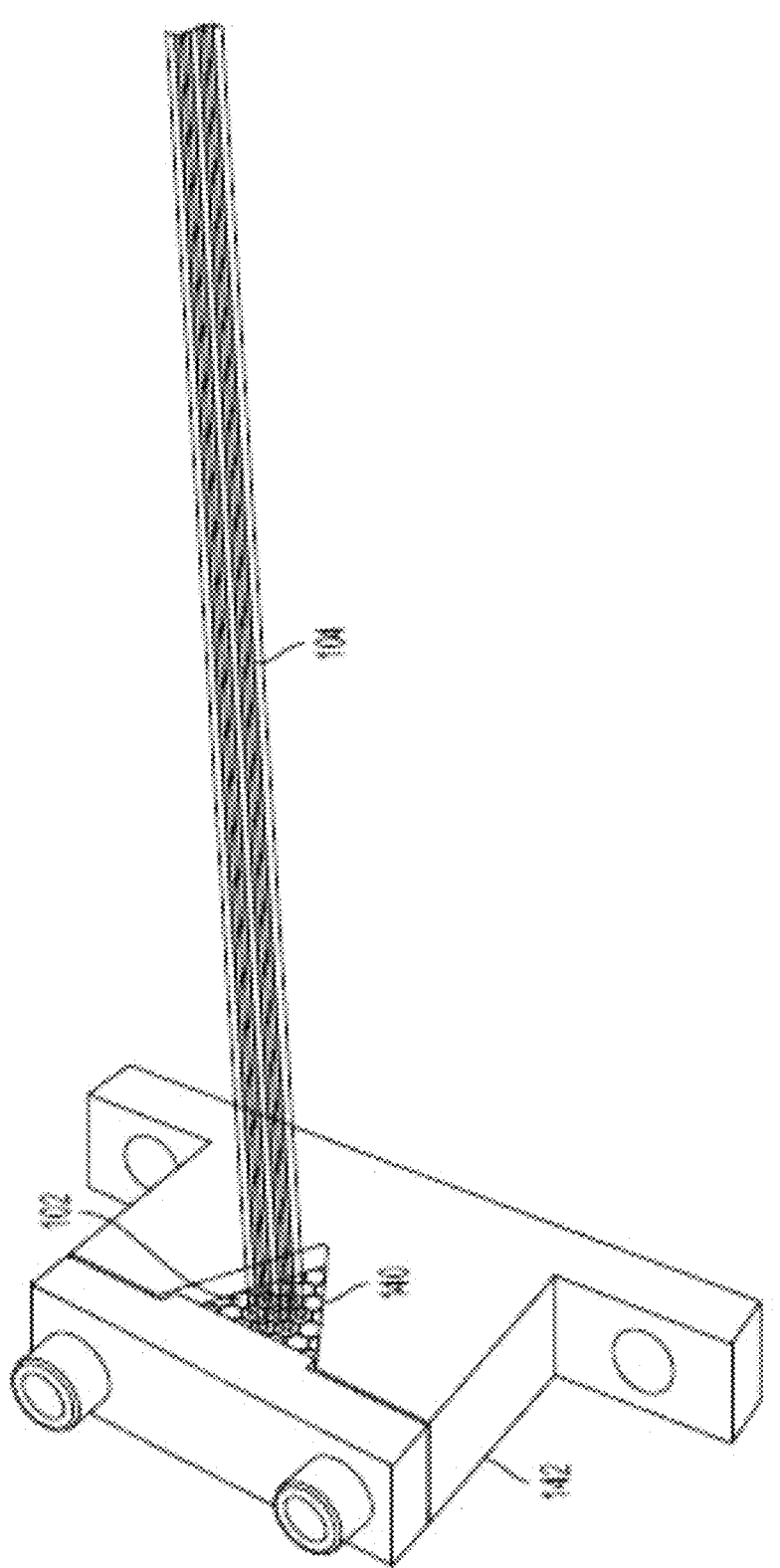
FIG. 9B illustrates the 7 channel FEFLA array in the V-groove holder with the rigid gain fibers coming out of the V-groove holder according to an embodiment of the disclosure.

FIG. 9B illustrates the 7 channel FEFLA array in the V-groove holder 142 with rigid gain fibers 104 coming out of the v-groove holder 140 according to an exemplary embodiment of the disclosure. Because the gain fiber 104 to hexagonal tapered end cap 102 splices are very strong and stiff, the 7 channel FEFLA array is fairly rigid and no additional support is used for the rigid gain fibers 104 in this example. However, for certain embodiments, additional support structures (such as support structures 106 depicted in FIGS. 1-2) may be utilized.

The FEFLA holder, dichroic mirror 118 and polarization divers SHG unit 136 may be mounted together to form an assembly. This whole assembly is about 30 cm square and 50 mm thick. The pump light delivered by the pump unit 112 is delivered via a steel jacketed fiber cable with a collimation and homogenized coupling optics assembly 114.

It will be appreciated that in FIG. 6, the dichroic mirror reflects the counter-pumping light and allows the output light from the FEFLA array to pass through, whereas in FIGS. 2 and 4, the dichroic mirror allows counter-pumping light to pass through and reflects the output light from the FEFLA array. The configuration of the dichroic mirror in this regard is flexible, and each of FIGS. 2, 4 and 6 may be implemented either way.

Exemplary embodiments of the disclosure as discussed herein have mostly been discussed and depicted with respect to hexagonal tapered end caps. However, it will be appreciated that in other exemplary embodiments, other shapes for the tapered end caps may also be used, so long as such shapes provide for tight packing (without tight packing, the spaces between the tapered end caps may cause light loss, overheating and damage to system components). For example, square or rectangular tapered end caps may be used in accordance with FEFLA arrays according to exemplary embodiments of the disclosure. Additionally, certain exemplary embodiments may utilize multiple tapered end cap shapes within the same FEFLA array. For example, a FEFLA array may include octagonal tapered end caps packed together with square tapered end caps in the interstitial spaces between adjacent octagonal end caps. Further, in these multi-shape embodiments, respective fibers corresponding to the different end cap shapes can be run at different wavelengths (e.g., Yb at 1030 nm-1090 nm and Erbium (Er) at 1330 nm-1360 nm), thereby providing for multiple modes or types of operation.

Figure 10:
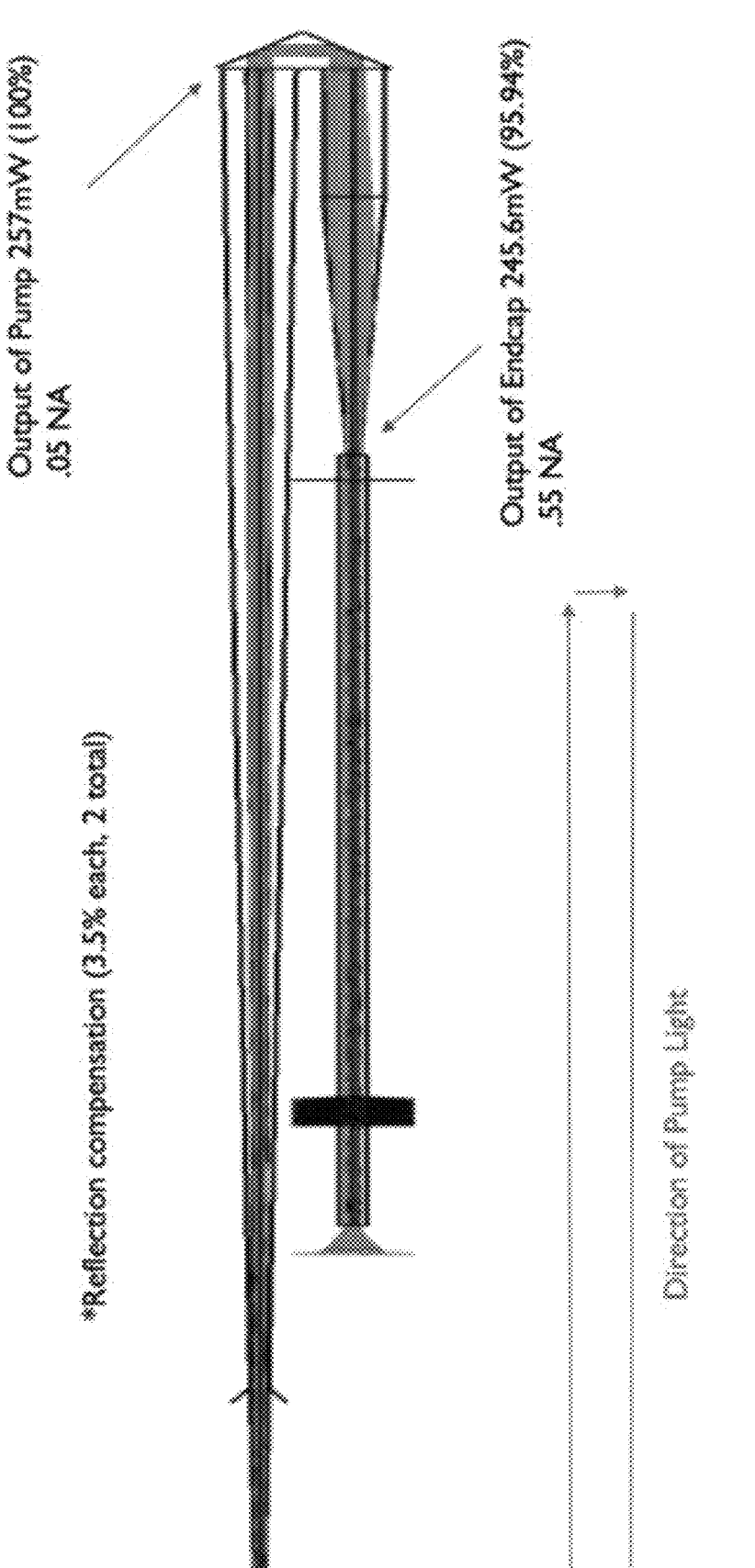
FIG. 10 illustrates a Zemax ray trace analysis of a folded tapered end cap according to an embodiment of the disclosure.

FIG. 10 illustrates a Zemax ray-trace model of an example of a tapered end cap counter-pumped amplifier according to an exemplary embodiment of the disclosure. The design is for a folded beam path for substantial size reduction. This configuration has the 105/125, 0.15 NA pump fiber up-tapered to a 400 μm core fiber with a reduction of NA to 0.05. The tapered end cap goes from a 200 μm/0.55 NA PCF core to a 1000 μm end cap in a 15 mm long taper. This 4:1 taper has a resulting acceptance NA of about 0.14 and produces a very high efficiency. This specific fiber arrangement has been fabricated and tested at low power.

Figure 11:
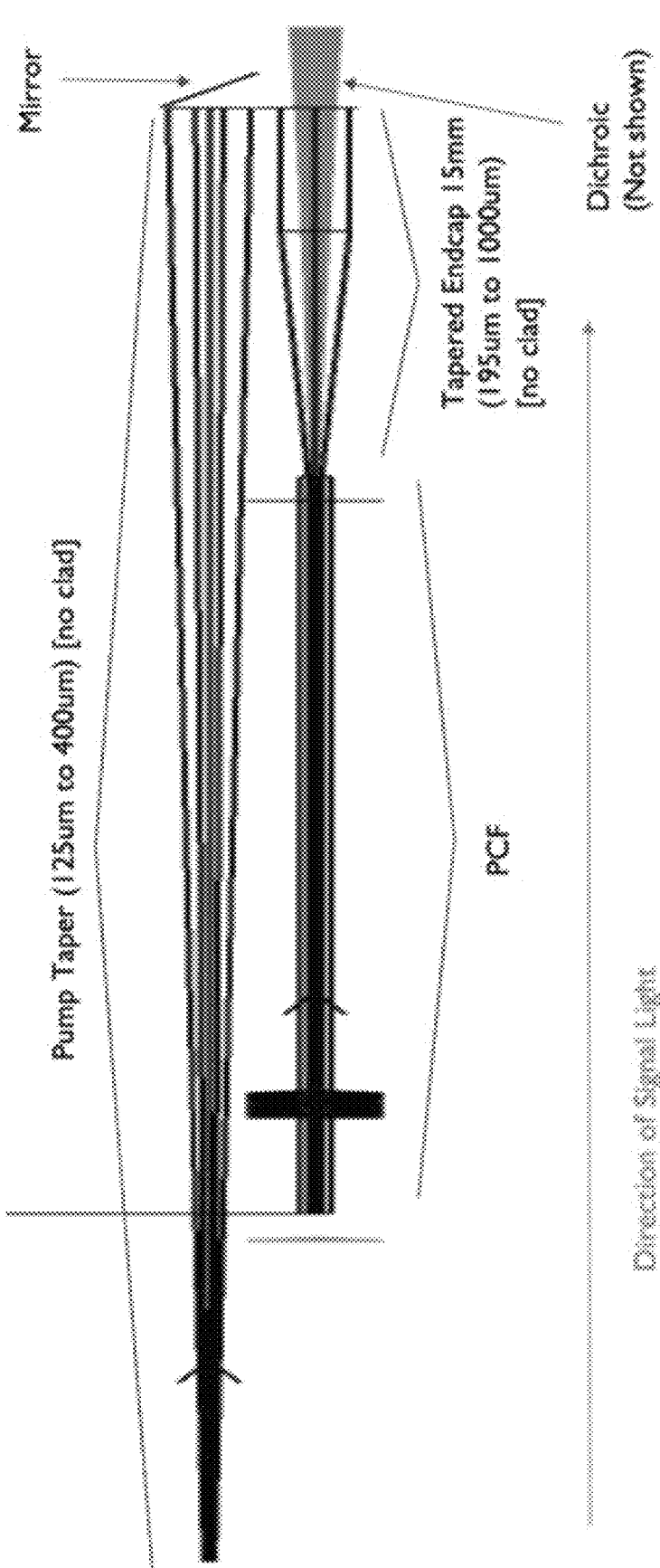
FIG. 11 illustrates a signal path output from a folded tapered end cap counter-pumped fiber laser according to an embodiment of the disclosure.

Additionally, FIG. 11 illustrates the evolution of the signal beam in a tapered end cap counter-pumped amplifier according to an exemplary embodiment of the disclosure. After the output of the PCF gain fiber, there is no more guiding of the signal beam. It expands adiabatically in the end cap, thus adding no deleterious effects on the output beam. At 15 mm, a flat surface can be used to minimize back reflections. Accounting for reflections, 96% pump efficiency was achievable with a 15 mm end cap taper. The tapers are constructed and spliced to PCF gain fibers, and these assemblies are mounted in glass capillaries. Both thermal tapering as well as etched tapers may be utilized to create double mode field adapters (DMFAs). U.S. Pat. No. 9,917,411, which is incorporated herein by reference in its entirety, describes examples of double mode field adapters. In many instances, the outer pump clad tapers down while the inner core tapers up. Optimization of the coupling, the creation of AR coatings on the fibers, and the determination of positioning tolerances may be provided.

For hexagonal tapers, achieving a taper that is both very straight and has less than, for example, 3 μm of diameter fluctuation in the taper profile is advantageous for its performance. The tapering process may be monitored so that it is achieved with precision.

Utilizing a splicing process for the hexagonal fibers that preserves the efficiency of the FEFLA taper is also advantageous. When splicing a highly tapered hexagonal fiber to a microstructured fiber such as PCF, the taper should be held straight and the temperature and other splice parameters controlled precisely to ensure no distortions in the propagating signal. This is achieved by using ultra-flat cleaving and active splicing processes where a source is propagated through the splice and its power and beam quality monitored. Multiple actively aligned splice runs are created and characterized for mode quality and efficiency. Additionally, fixturing may be provided for removing the finished splice from the splicing setup and to the packaging process without breaking the very fragile splice.

Figure 12A:
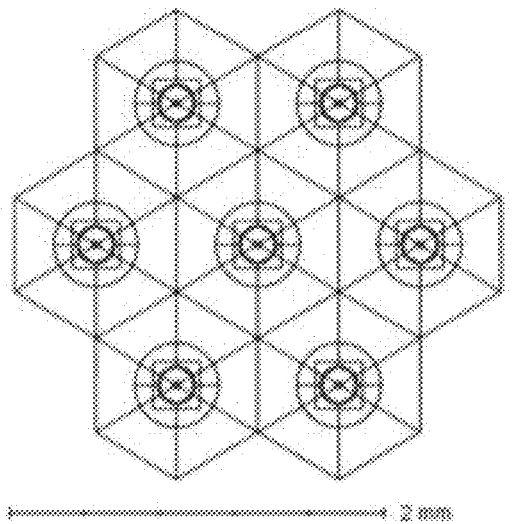
FIG. 12A illustrates a 7 FEFLA channel setup according to an embodiment of the disclosure.
Figure 12B:
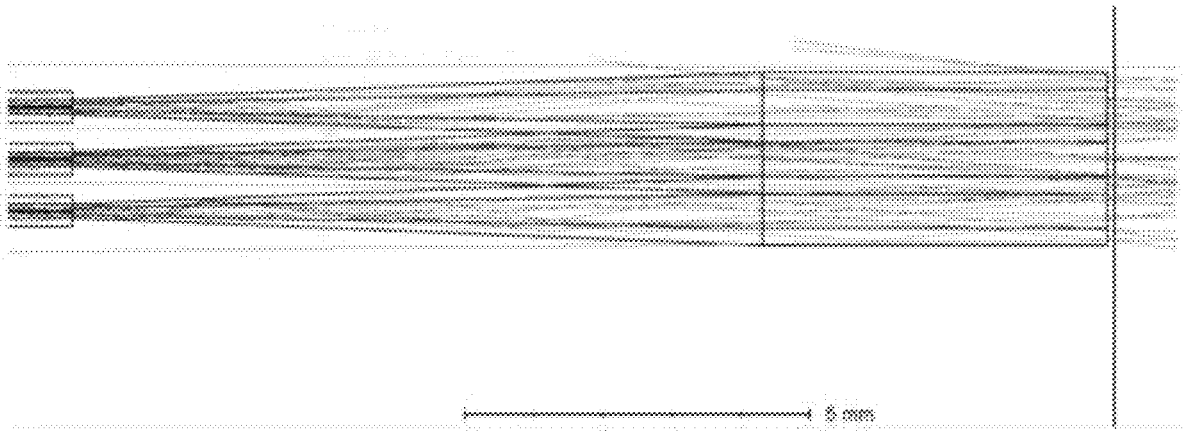
FIG. 12B illustrates a taper ray trace output according to an embodiment of the disclosure.
Figure 12C:
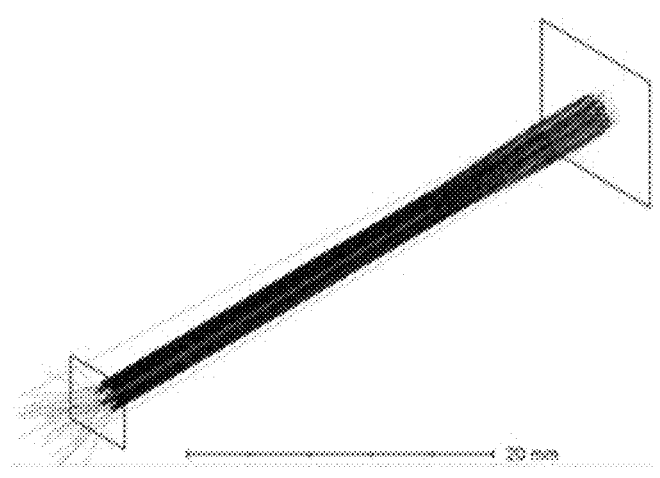
FIG. 12C illustrates a taper/amplifier ray trace output according to an embodiment of the disclosure.
Figure 12D:
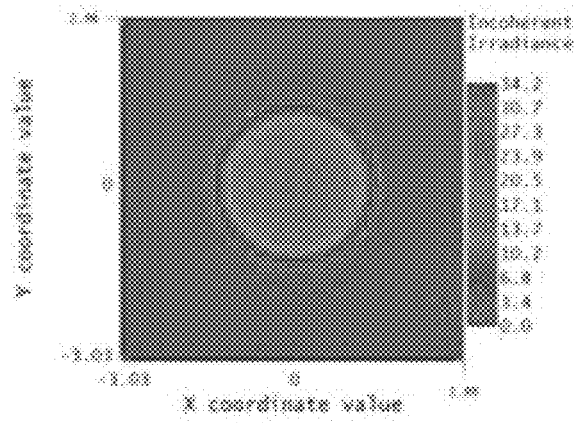
FIG. 12D illustrates a uniform pump output according to an embodiment of the disclosure.
Figure 12E:
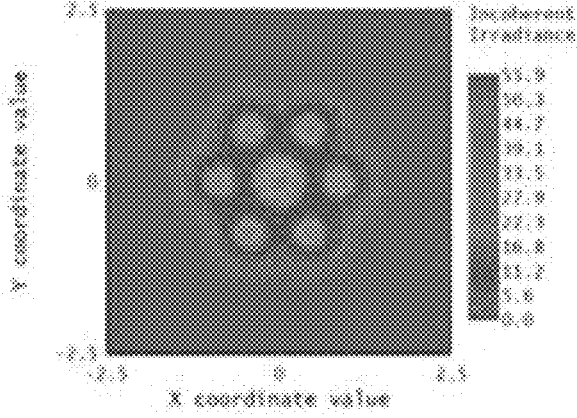
FIG. 12E illustrates a 7 channel output according to an embodiment of the disclosure.

FIGS. 12A-12E illustrate a FEFLA Zemax model according to an exemplary embodiment of the disclosure. FIG. 12A illustrates a 7 FEFLA channel setup, FIG. 12B illustrates a taper ray trace output, FIG. 12C illustrates a taper/amplifier ray trace output, FIG. 12D illustrates a uniform pump input, and FIG. 12E illustrates a 7 channel output.

FIGS. 12A-12E represent an initial model setup showing 7 channels with 1 mm hexagonal fibers tapered to a 200 μm core and spliced to a 40/200 μm PCF Yb fiber. A uniform input source was created to illuminate the input face of the FEFLA array. A detector screen was placed on the output of the array to show that the light is collected in the fiber array.

Through modeling, parameters such as hexagonal fiber diameter, taper length, and taper ratio may be optimized, and the effects of pump uniformity and pump vs. array overlap may be tested. Array pump efficiency and pumping uniformity may also be simulated.

For coherently combined arrays, it is advantageous for fibers in the array to be precisely aligned such that, in the far field, the beams overlap to provide efficient coherent combining. Further, it is advantageous for simplicity and efficiency to passively align fibers in an array, as opposed to active alignment requiring complicated movable parts. Providing alignment at micron accuracies is advantageous for efficient combining. Inexpensive fused Zirconia ferrules and sleeves may be used to create an inexpensive arraying method.

Figure 13A:
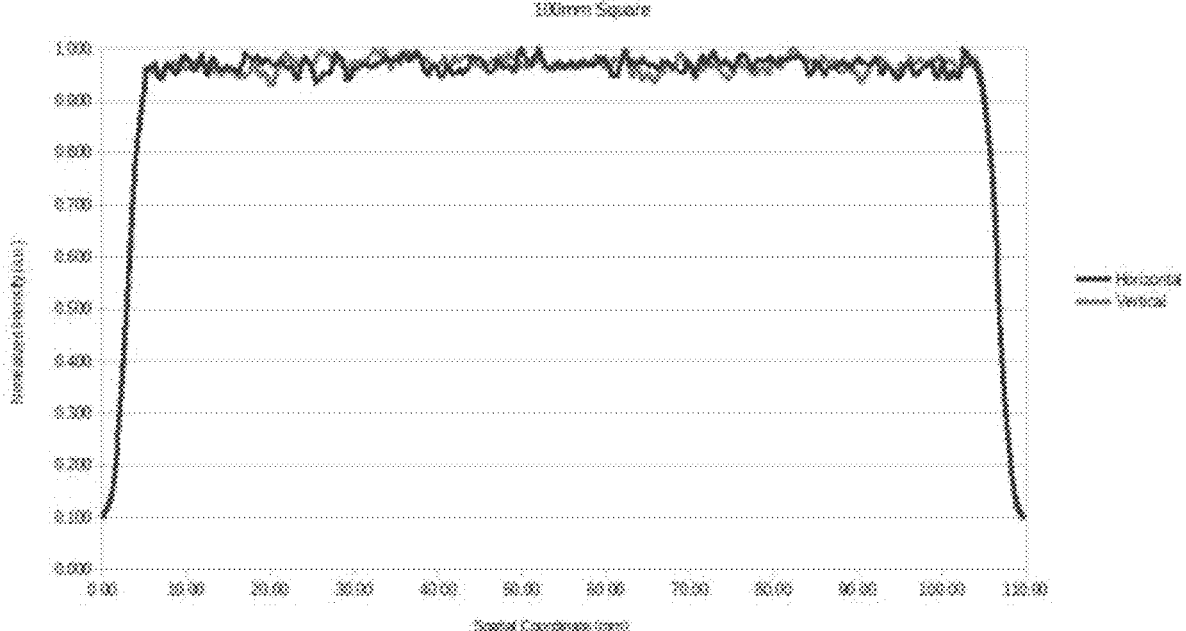
FIG. 13A illustrates a flat top uniform profile of a 600 μm square fiber according to an embodiment of the disclosure.
Figure 13B:
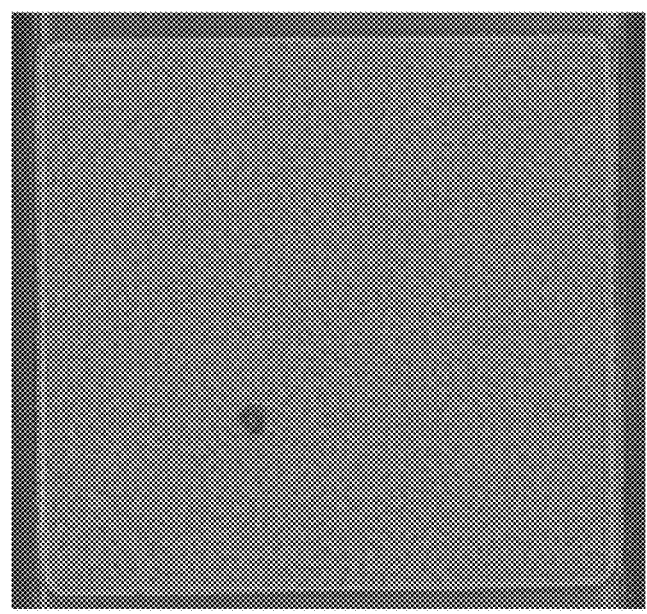
FIG. 13B illustrates a beam profile image of the fiber output of FIG. 13A according to an embodiment of the disclosure.

FIGS. 13A-13B illustrate an exemplary output corresponding to a square fiber showing very flat profiles with very sharp quarters according to an exemplary embodiment of the disclosure. FIG. 13A illustrates a flat top uniform profile of a 600 μm square fiber, and FIG. 13B illustrates a beam profile image of the fiber output of FIG. 13A. For both efficient and uniform pump coupling of the FEFLA structure, it is advantageous that the pump profile be both uniform and matched to the fiber array. In addition, since the output of a typical 200 μm 0.22 NA fiber is around 400 W, multi-kW profiles can be synthesized with a single integrating fiber or with multiple fiber outputs.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A fiber laser system, comprising:
an array of gain fibers configured to transmit signal light;
an array of tapered end caps configured to receive the signal light from the array of gain fibers and output the signal light, wherein each gain fiber in the array of gain fibers is spliced to a respective tapered end cap of the array of tapered end caps;
a counter-pumping light source configured to output counter-pumping light; and
a dichroic mirror configured to receive the counter-pumping light from the counter-pumping light source and to receive the signal light from the array of tapered end caps, wherein the dichroic mirror is further configured to:
allow the counter-pumping light received by the dichroic mirror to pass through the dichroic mirror and reflect the signal light received by the dichroic mirror; or
allow the signal light received by the dichroic mirror to pass through the dichroic mirror and reflect the counter-pumping light received by the dichroic mirror;
wherein the tapered end caps of the array of tapered end caps are tightly packed such that the array does not include any spaces between tapered end caps of the array; and
wherein the counter-pumping light source is a single multi-element laser diode source configured to simultaneously output the counter-pumping light to the entire array of tapered end caps in parallel via the dichroic mirror.

2. The fiber laser system according to claim 1, wherein each of the tapered end caps of the array of tapered end caps has a hexagonal shape.

3. The fiber laser system according to claim 1, wherein each of the tapered end caps of the array of tapered end caps has a square shape.

4. The fiber laser system according to claim 1, further comprising:
a V-groove holder having a V-groove configured to hold the array of tapered end caps.

5. The fiber laser system according to claim 4, wherein the V-groove comprises filler material around the array of tapered end caps held in the V-groove.

6. The fiber laser system according to claim 1, further comprising:
a plurality of variable-linewidth software-defined seed sources, each configured to output light pulses corresponding to the signal light.

7. The fiber laser system according to claim 6, further comprising:
a plurality of pre-amplifiers, each configured to receive light pulses from a respective variable-linewidth software-defined seed source and output amplified light pulses to a respective mode field adapter connected to a respective gain fiber of the array of gain fibers.

8. The fiber laser system according to claim 1, further comprising:

a shaping and imaging optics assembly configured to receive the counter-pumping light and focus the counter-pumping light towards the array of tapered end caps.

9. A fiber laser system, comprising:

an array of gain fibers configured to transmit signal light; and an array of tapered end caps configured to receive the signal light from the array of gain fibers and output the signal light, wherein each gain fiber in the array of gain fibers is spliced to a respective tapered end cap of the array of tapered end caps;

wherein the tapered end caps of the array of tapered end caps are tightly packed such that the array does not include any spaces between tapered end caps of the array; and wherein the entire array of tapered end caps is configured to be simultaneously counter-pumped in parallel via a dichroic mirror by a single multi-element laser diode source configured to output counter-pumping light to the array of tapered end caps.

10. The fiber laser system according to claim 9, wherein each of the tapered end caps of the array of tapered end caps has a hexagonal shape.

11. The fiber laser system according to claim 9, wherein each of the tapered end caps of the array of tapered end caps has a square shape.

12. The fiber laser system according to claim 9, further comprising:

a plurality of variable-linewidth software-defined seed sources, each configured to output light pulses corresponding to the signal light.

13. The fiber laser system according to claim 9, further comprising:

a plurality of pre-amplifiers, each configured to receive light pulses from a respective variable-linewidth software-defined seed source and output amplified light pulses to a respective mode field adapter connected to a respective gain fiber of the array of gain fibers.

14. The fiber laser system according to claim 9, further comprising:

a polarizer configured to receive the signal light output from the array of tapered end caps and to separate the received signal light into two orthogonal polarizations; and a second harmonic generation (SHG) unit configured to receive the two orthogonal polarizations and recombine them to form an output beam of the fiber laser system.

15. The fiber laser system according to claim 14, wherein each of the tapered end caps of the array of tapered end caps has a hexagonal shape.

16. The fiber laser system according to claim 14, wherein each of the tapered end caps of the array of tapered end caps has a square shape.

17. The fiber laser system according to claim 14, wherein the SHG unit is further configured to utilize a frequency doubling scheme in heated lithium triborate (LBO) crystals or barium borate (BBO) crystals.

18. The fiber laser system according to claim 14, further comprising:

a plurality of variable-linewidth software-defined seed sources, each configured to output light pulses; and a plurality of pre-amplifiers, each configured to receive light pulses from a respective variable-linewidth software-defined seed source and output amplified light pulses to a respective mode field adapter connected to a respective gain fiber of the array of gain fibers.

* * * * *